Nov. 10, 1959 R. VASALLI 2,912,097
CONVEYING APPARATUS FOR ALIMENTARY PASTE
PRODUCTS AND THE LIKE
Filed April 15, 1957

INVENTOR:
RENZO VASALLI
BY C. P. Goepel
his ATTORNEY

United States Patent Office 2,912,097
Patented Nov. 10, 1959

2,912,097

CONVEYING APPARATUS FOR ALIMENTARY PASTE PRODUCTS AND THE LIKE

Renzo Vasalli, Kobelhohe, Niederuzwil, Switzerland, assignor to Gebrueder Buehler, Uzwil, Switzerland, a firm of Switzerland Application April 15, 1957, Serial No. 652,729

Claims priority, application Switzerland April 16, 1956

6 Claims. (Cl. 198—158)

My present invention relates to improvements in driers which involve traveling carriers, racks or shelves for the goods to be dried, and the principal object of the invention is to raise the drier capacity by increasing the number of said carriers but without enlarging the drier space.

Various systems of carrier driers are known, in which the carriers move on a track. The carriers generally are conveyed through the drier by a chain or a similar drive means which engages the carriers directly, on the same path as is followed by said chain or other means. At the points of deflection or reversal of the carrier tracks, care has to be taken to give the carriers sufficient space for traveling through the curves.

These disadvantages of known carrier driers shall be eliminated by the present invention so that the drier may accommodate a greater number of carriers of the same size and capacity. The invention relates to a drier with traveling carriers, for example for alimentary food-paste products, which is characterized in that the carriers are conveyed in a fixed track and through rods extending from the points of guiding on said track, said rods being hingedly attached to at least one chain which is guided in another track, and the carrier track being situated outside the chain track at the points of deflection or reversal.

A preferred embodiment of the invention is schematically shown, by way of example, in the drawing in which.

Figure 1:
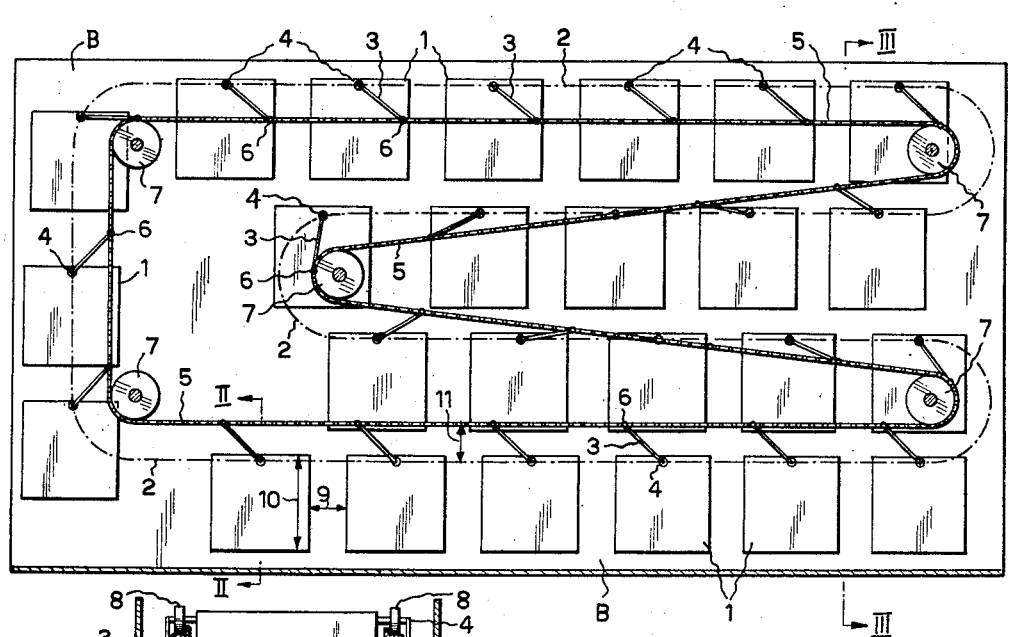
Fig. 1 is a longitudinal vertical section through the drier.
Figure 3:
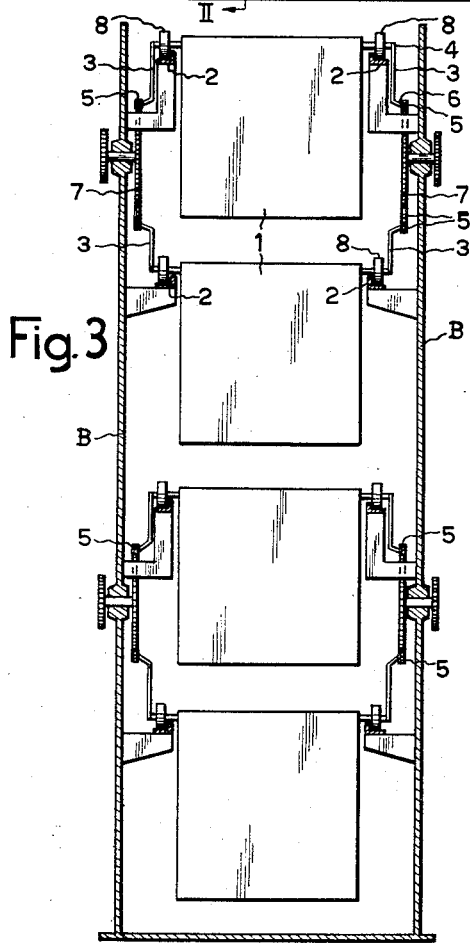
Fig. 3 is a similar but more detailed cross-section on the line III—III of Fig. 1, the last two figures being drawn in a larger scale than Fig. 1.
Figure 2:
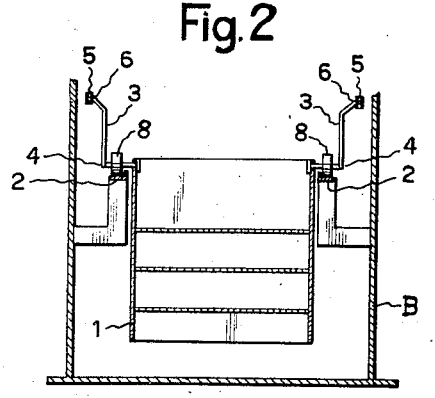
Fig. 2 is a cross-section through a traveling carrier with guide rails and chain on the line II—II of Fig. 1.

The carriers, racks or shelves 1 are guided on a track 2 at points of engagement or guiding 4. They are drawn through the drier by a chain 5 with the aid of rods 3 which extend from said points 4 and are hingedly connected to chain 5 at points 6. As shown in Fig. 2, the carrier track is, for example, materialized by two rails 2 on which move rollers 8 mounted on the carriers 1 and which are fixed on brackets to the walls of the drier box B. In Fig. 2 are shown two parallel chains 5 instead of a single chain, which draw the carriers 1 through the drier on the traction rods 3.

At the points of deflection or reversal, the carrier track 2 is always situated outside of chain track 5. In the drier shown, carrier track 2 in its straight branches always is horizontal or vertical, whereas chain track 5 accordingly has to fall or rise between two points of deflection of reversed sense. At the points of deflection, the chains are trained, for example, over rollers 7 which are journaled in the walls of box B.

By these means, the spacing 9 of the carriers 1 on the horizontal carrier track may be made less than the height 10 of the carriers. In the case of carriers having a directly-engaging chain, such arrangement, however, gives origin to impossible conditions at the points of deflection. In the drier according to the invention, therefore, a greater number of carriers are accommodated in the same space than in known driers.

The spacing 11 between carrier track and chain track naturally has to be always less than the length of the connecting rods 3. The latter may be traction rods or push rods, i.e. the carriers may either be drawn or pushed through the drier.

The carriers themselves may be built in various ways and, for example, may be equipped with rods for long-size alimentary products such as spaghetti or with perforated sheets or bottoms for short-size alimentary products and the like.

What I claim as new and desire to secure by Letters Patent, is:

1. A conveyor system comprising, in combination, a plurality of carriers; an endless track for guiding said carriers so constructed that the direction of movement of said carriers therealong is reversed at more than two points; flexible drive means for said carriers disposed for travel in an endless path which is inside said track at each point where the direction of travel of said carriers is reversed; and a plurality of rigid connecting means, at least one for each of said carriers, and each pivotally connected to one of said carriers and to said drive means, respectively, for moving said carriers along said track when said drive means is advanced in said path, the connection of said connecting means with said carriers and said drive means being such that the point at which one of said connecting means is connected to one of said carriers is free to describe a circle about the point of connection between said connecting means and said drive means.

2. A conveyor system comprising, in combination, a plurality of carriers; an endless track for guiding said carriers and having at least three arcuate sections for reversing the direction of travel of said carriers while said carriers move along said arcuate sections; flexible drive means mounted for movement in an endless path which is inside the arcuate sections of said track; and a plurality of rigid connecting means, at least one for each of said carriers, and each pivotally connected to one of said carriers and to said drive means, respectively, for moving said carriers along said track when said drive means advances in said path, the connection of said connecting means with said carriers and said drive means being such that the point at which one of said connecting means is connected to one of said carriers is free to describe a circle about the point of connection between said connecting means and said drive means.

3. A conveyor system comprising, in combination, a plurality of carriers; an endless track for guiding said carriers and having at least three arcuate sections for reversing the direction of movement of said carriers; flexible drive means mounted for travel in an endless path which is inside each of said arcuate sections and crosses said track between each pair of said arcuate sections at which the movement of said carriers is reversed in opposing directions; and a plurality of connecting means, at least one for each of said carriers, and each pivotally connected with one of said carriers and with said drive means, respectively, for advancing said carriers along said track when said drive means advances in said path, the connection of said connecting means with said carriers and said drive means being such that the point at which one of said connecting means is connected to one of said carriers is free to describe a circle about the point of connection between said connecting means and said drive means.

4. A conveyor system comprising, in combination, a plurality of carriers; a pair of wheels connected with each of said carriers; an endless track comprising a pair of spaced rails for guiding the respective wheels of said carriers, each of said rails having at least three arcuate sections for reversing the direction of travel of said carriers while the wheels of said carriers move along said arcuate sections; at least one chain mounted for movement in an endless path which is inside the arcuate sections of said rails; and a plurality of rigid connecting rods, at least one for each of said carriers, and each pivotally connected to one of said carriers and to said chains, respectively, for moving the wheels of said carriers along said rails when said chain advances in said path, the connection of said rods with said carriers and said chain being such that the point at which one of said rods is connected to one of said carriers is free to describe a circle about the point of connection between said rod and said chain.

5. A conveyor system comprising, in combination, a plurality of carriers; a track for guiding said carriers in an endless path and having at least one horizontal section and at least three arcuate sections with said arcuate sections so disposed as to reverse the direction of travel of said carriers when said carriers are moved therealong, the distance between the adjacent ones of said carriers being less than the height thereof when said carriers travel along the horizontal section of said track; flexible drive means mounted for movement in an endless path which is inside said arcuate sections of said track; and a plurality of rigid connecting rods, at least one for each of said carriers, and each pivotally connected to one of said carriers and to said drive means, respectively, for moving said carriers along said track when said drive means advances in said path, the connection of said rods with said carriers and said drive means being such that the point at which one of said rods is connected to one of said carriers is free to describe a circle about the point of connection between said rod and said drive means.

6. A conveyor system comprising, in combination, a plurality of carriers; an endless track for guiding said carriers and having at least three arcuate sections for reversing the direction of movement of said carriers; flexible drive means mounted for travel in an endless path which is inside each of said arcuate sections and crosses said track between each pair of said arcuate sections at which the movement of said carriers is reversed in opposing directions; and a plurality of connecting means, at least one for each of said carriers, and each pivotally connected with one of said carriers and with said drive means, respectively, for advancing said carriers along said track when said drive means advances in said path, the length of said connecting means exceeding the greatest distance between said track and said drive means and the connection of said connecting means with said carriers and said drive means being such that the point at which one of said connecting means is connected to one of said carriers is free to describe a circle about the point of connection between said connecting means and said drive means.

References Cited in the file of this patent

UNITED STATES PATENTS

| | | |
|---|---|---|
| 222,982 | Bliss | Dec. 30, 1879 |
| 1,871,372 | James | Aug. 9, 1932 |
| 1,907,971 | James | May 9, 1933 |
| 2,358,507 | Haberstump | Sept. 19, 1944 |